United States Patent [19]
Schloss

[11] Patent Number: 5,157,727
[45] Date of Patent: Oct. 20, 1992

[54] PROCESS FOR DIGITIZING SPEECH

[76] Inventor: Alden Schloss, 4510 San Taela Ct., Woodland Hills, Calif. 91364

[21] Appl. No.: 96,160

[22] Filed: Sep. 14, 1987

Related U.S. Application Data

[63] Continuation-in-part of Ser. No. 356,829, Mar. 10, 1982, abandoned, which is a continuation-in-part of Ser. No. 123,846, Feb. 22, 1980, abandoned.

[51] Int. Cl.$^5$ .............................................. G10L 5/00
[52] U.S. Cl. ..................................................... 381/31
[58] Field of Search ................................... 381/31-36; 375/118; 328/55

[56] References Cited

U.S. PATENT DOCUMENTS 3,553,372  1/1971  Wright .................................... 179/1
4,070,550  1/1978  Miller .................................... 375/22

OTHER PUBLICATIONS

Fawe, "Interpretation of Infinite Clipped Speech", IEEB Trans. on Audio and EA, Dec. 1966, pp. 178–183.

Electronics Review, "Phone Setup . . . ", Electronics, Mar. 17, 1977, pp. 9E–10E.
McGraw-Hill Dictionary of Scientific and Technical Terms (Zd ed. 1978), pp. 1289–1291.

*Primary Examiner*—Emanuel S. Kemeny

[57] ABSTRACT

A process is disclosed for digitizing (more precisely encoding) speech for the purpose of reducing information rate and bandwidth relative to that of prior art means to digitize speech, while enjoying a high signal to noise ratio. Using the the same encoding techniques the process can be used for storage of speech and machine recognition of speech. The process depends on detecting audio waveform zero crossings and generating uniform pulses at the time of the zero crossings. The uniform pulses are created through a regenerative process and are independent of the actual waveform shape save the time of zero crossing. Transmission (or storage) of these uniform pulses permits reconstruction of highly intelligible speech. Ratios of times between zero crossings is used in a new technique for machine word recognition; said ratios allowing recognition regardless of the speakers actual speech rate.

12 Claims, 2 Drawing Sheets

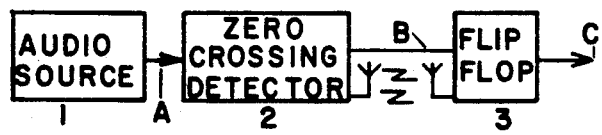
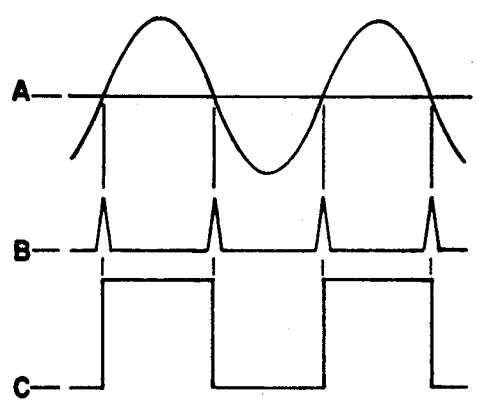
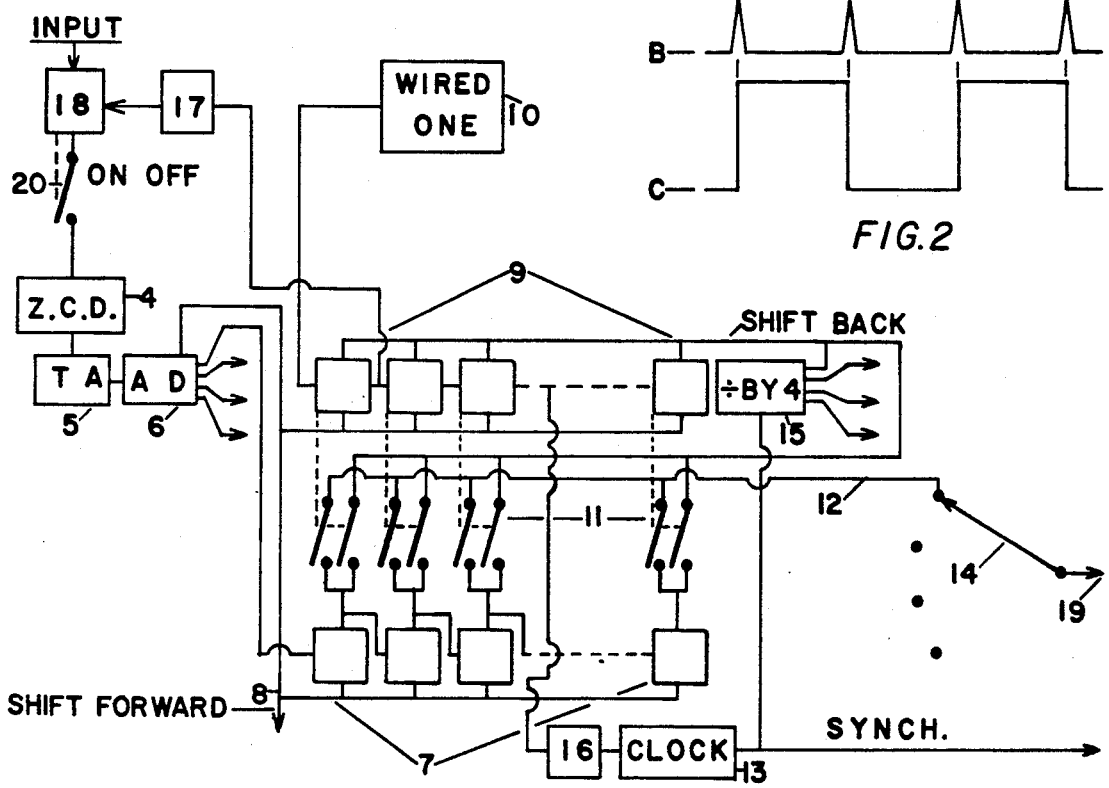
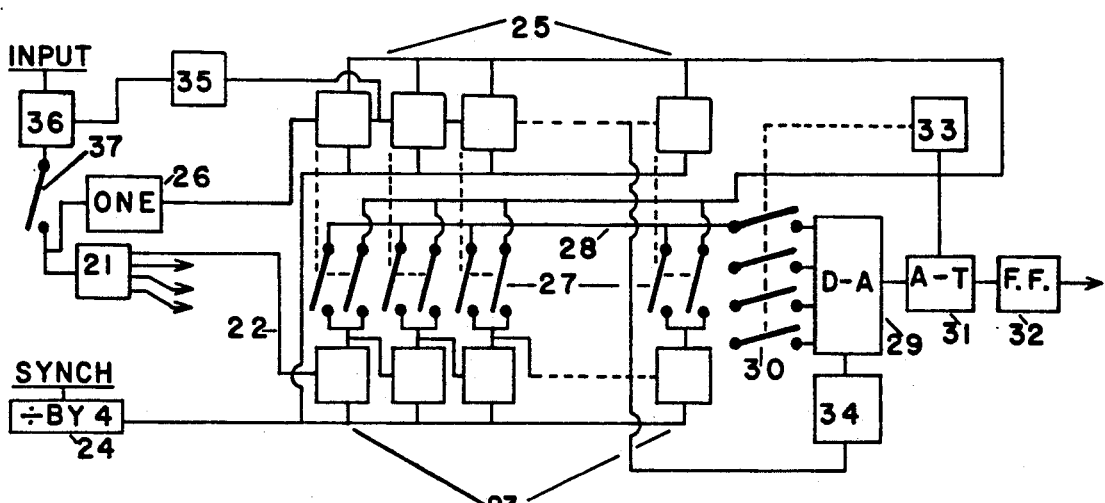

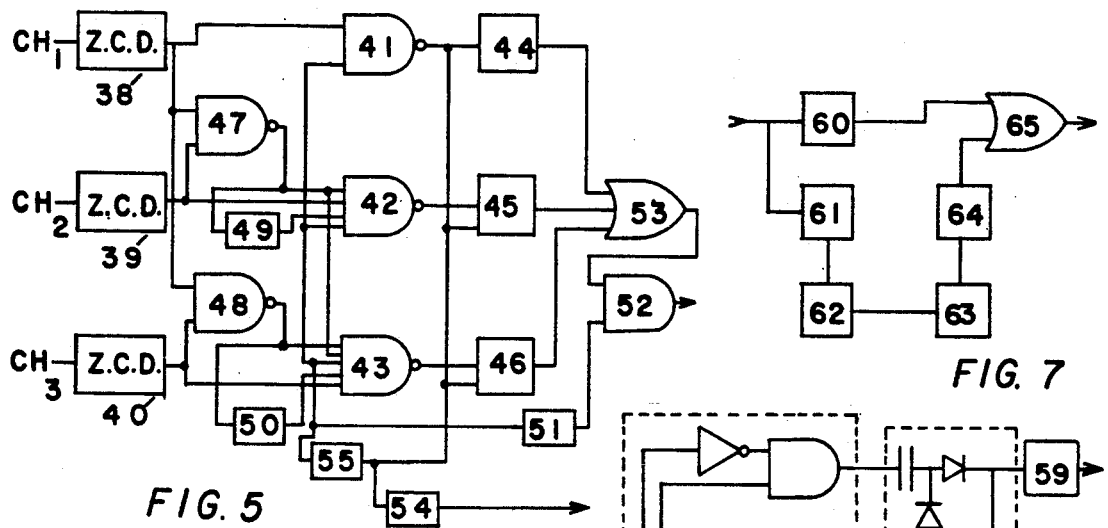
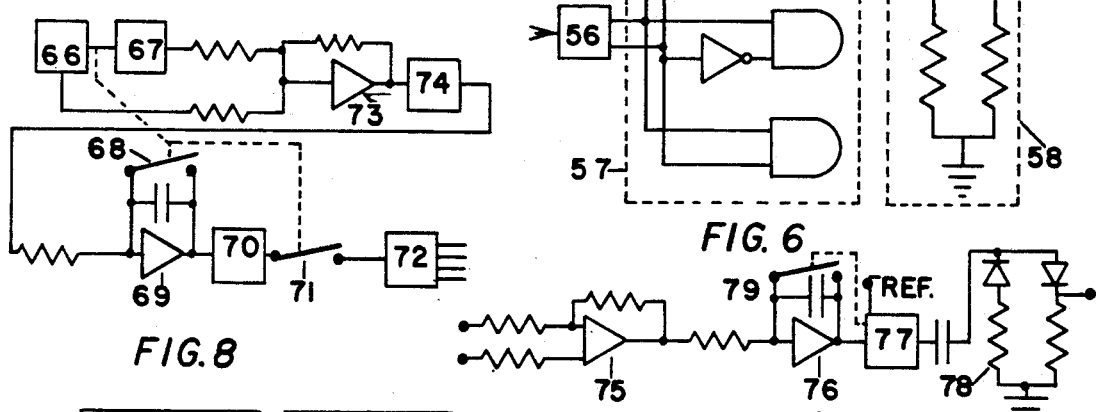
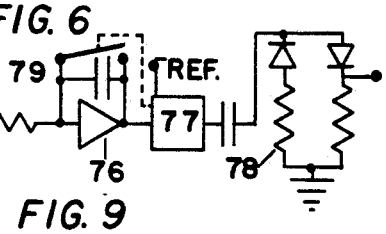
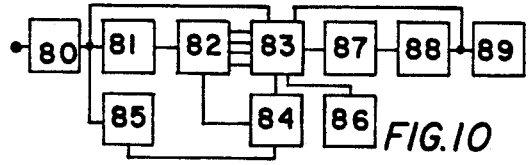
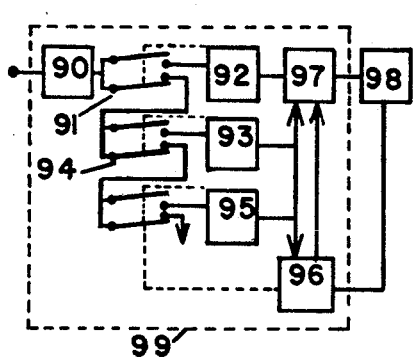
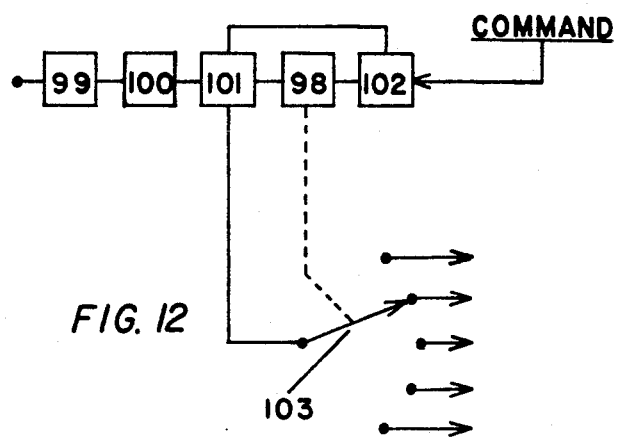

PROCESS FOR DIGITIZING SPEECH

This application is a continuation-in-part of an application of the same title filed Mar. 10, 1982, Ser. No. 06/356,829, now abandoned. That application in turn was a continuation-in-part of the same title filed Feb. 22, 1980, Ser. No. 123,846, now abandoned.

SUMMARY OF THE INVENTION

This invention relates to a process for digitizing (encoding) speech for the purpose of transmission, storage and machine recognition of speech. The technique affords the advantage of great signal to noise ratio but at relatively reduced bandwidth compared to present processes for digitizing speech.

Present speech processes send (and store) an inordinate excess of information. The most primative process utilizes the entire information contained in an analog wave. For example, a pure tone (a sine wave) will be examined for every amplitude value during the course of the wave excursion. Values near zero (or peak amplitudes) near zero will experience poor signal to noise ratio as the signal approaches the noise. A system called pulse code modulation samples the analog wave and sends pulses, so time-modulated as to express the original analog energy values. It enjoys better signal to noise ratio than the analog scheme but still at entirely too great a bandwidth. Finally, a coding system exists which uses pulses as digital value numbers to signal the analog value of the speech wave. At reception the value numbers have to be decoded to construct an analog wave. The signal to noise ratio is good but at entirely too great a bandwidth. (At least seven times that of the present invention.) In the frequency domain one may analyze a speech wave and find many simultanious frequencies present. To determine the coeficients and phase angles of the components one must do a Fourier analysis AFTER THE FACT. Indeed, since there is no such thing as instantanious frequency, ALL information regarding frequency MUST be done as analysis in non-real time. However, in the time domain, a speech wave (as a pressure, voltage or current) signal is single valued. A speech voltage (for example) can have only ONE amplitude value at a time regardless of the compexity of the wave form. Working in the time domain (looking for TIME events) permits working in real time, a very important feature in communications. Certainly for one KNOWN signal one can say its period is the reciprocal of its frequency. However speech is not a well behaved signal generator supplying one frequency continously, it is a stochastic process, meaning one can never know in real time what frequency(s) is (or are) present. Moreover, the amplitude and derivative of a speech wave can not be known in advance. The derivative discloses the slope of the rising (or falling) waveform. Finding when the waveform goes through zero (or any other datum) and placing at that time a generated pulse allows one to ignore slopes and amplitudes. The generated pulse is used to signal reconstruction means such as a "flip-flop". Since there are two zero crossings per cycle and the flip-flop counts down by two, there results a square wave where there was a (possible) sine wave. A square wave will exist in time where the original wave (regardless of its complexity) existed. A further process is used wherein the time between zero crossings results in an analog value which is converted to a digital value and that value number is used to signal a digital to analog converter which recovers the original time between zero crossings and recreate uniform pulses to signal reconstruction means.

Since square waves replace complex speech waves, amplification can be accomplished using efficient switches rather than analog amplifiers. Square wave replacement of speech waves may be viewed as extreme distortion. In communication one is not concerned with faithful reproduction but only with transfer of intelligence. The square waves replacing the original complex speech waves result in surprising speech clarity; indeed one can recognize the speaker by speech so processed. In the IEEE Transaction on Audio and Electracoustics, Vol AU-14 No. 4 Dec'66 by Fawe, a scholarly treatise is carried out addressing just that surprising fact. The author was investigating just why such extreme distortion can be so intelligible. He uses auto and cross correlation to explain what noise is added due to his assumption of infinite clipping. Fawe assumes one merely clips the wave to arrive at pseudo square waves. Clipping merely establishes some fixed amplitude to an original analog wave. Between clipping values the ORIGINAL speech wave still exists. The ORIGINAL slopes are still present. Fawe mentions "infinite" clipping which means the wave is greatly amplified before it is clipped. Great amplification then places the clip level close to the zero level with its ever present noise. The noise would then add time jitter to the wave causing errounious zero crossing information which in turn results in noise. If less amplification than "infinite" is used, then at low frequencies very long transitions occur and the waves are not truly square. For example, assume one clips a peak amplitude of 20 Volts at 5 Volts. The derivative of a sine wave is $\omega(E_{pk} \cos \omega t)$. The maximum is simply $\omega E_{pk}$. For a 4 Khz sine wave rate is about 500 millivolts per microsecond and for a 300 Hz signal it is only 38 MV per microsecond; two different rise times for the same amplitude of signal. To reach the clip level of 5 Volts the 4 Khz signal takes ten microseconds while the 300 Hz signal takes about 133 microseconds. 133 microseconds is equal to a full period of a 7.5 Khz wave. Increasing the signal amplitude before clipping would reduce the 300 Hz transition time but at the expense of noise (time-jitter). From his computer analysis Fawe obliquly states that "the information bearing elements are in the zero-crossings and that clipped speech can be sent in a strongly disturbed channel". Fawe here suggests sending the entire clipped wave with its original varying transitions to the clip level. The present invention has been reduced to actual practice and 3 microsecond pulses were generated at the time of zero crossings. The pulses are uniform and have constant high rate transitions regardless of the transition rate of the original speech. The average up-time of a Fawe signal is half the signal period. The up-time must be used (or the down-time) as the time of transmitting radio energy to communicate the signal to a remote point. This is known as a 50% duty cycle. The transmitter must remain on for half the time. To transmit the pulses in the present invention, results in a MAXIMUM duty cycle of 2.4%. For a given transmitter power, the latter pulses can be sent at 20.8 times the power of the Fawe "square waves" resulting in greater signal to noise ratio at some remote receiving point, while sending the SAME information. This is possible because the reconstruction means at the receiver portrays a kind of intelligence. Once signaled to a high state by a short pulse, the flip-flop stays up until the next pulse is received when it then goes down. The Fawe suggestion can not do that. Further, Fawe in his abstract and conclusions states that there is a need for seperate information to provide "naturalness"; that seperate information is on the envelope or dynamics. It is not known whether Fawe ever carried out his suggestion but the absence of dynamics is no doubt due to his simple clipping approach, that is, the clipping causes loss of dynamics. In the present invention, there is no loss in dynamics. It is simply a serendipitous fact due possibly to the fact that the original speech (clipped) is not sent but the speech is reconstructed. Fawe never FINDS the zero crossings, he sends the entire speech wave; clipped. Fawe indeed does not describe a process, he suggests sending clipped speech, he does NOT send pulses as in the present invention. The slow transitions Fawe experiences are useless in the present invention. As will be shown later generating uniform pulses at speech zero crossings does NOT necessitate clipping the speech. So far as transmission is concerned there is NO CLIPPED SPEECH in the present invention. In the receiver, square waves replace any complex wave experience in the transmitter which are still NOT CLIPPED waves; they do NOT contain the original transitions and are newly constructed.

In U.S. Pat. No. 3,553,372 Wright et al describes apparatus for speech recognition. In this invention Wright uses absolute times between zero crossings and stores those times in NON-REAL time. He classifies different sets of such times and stores them in "channels". There are different limits to the times found for each different channel. At column 4 lines 28 to 35, he describes the channels; in channel 1 times from zero to 1.31 msec are stored, in channel 2 times from 1.31 to 0.93 msec are stored and so fourth. This is a time domain equivalent to a frequency domain comb filter. To increase his resolution, he changes time scales while looking for his absolute times. Wright does not use constant width pulses. At column 7 lines 18 to 20, he states two negative pulses are of "constant width". He MEANT equal. He referes to the period T above (line 3 to 5) where he describes varying pulse intervals shown in FIG. 12 with varying pulses. Wrights apparatus does not suggest real time pulse transmission or even constant pulse widths. His device is used to recognize speech using absolute times with such times populating "pidgeon coops" he calls channels. Wright uses time between zero crossings as a step in an entirely different process. A new process may use old process steps. Therefore the Wright apparatus was not even an aid in comming to the present invention.

There is an article in Electronics Review (Mar. 17, 1977) that addresses a means to increase use of a given communications band. The increased use is due to the fact that the average person only speaks 25% to 40% of the time allowing dead time in transmission. A form of time division multiplex is described. In this device a "speech detector" uses the level of the signal and the rate of zero crossings (not the time between zero crossings) to aid in distinguishing a low level signal from noise. (Seventh and sixth line from botton Pg 9E.) The Electronics Review system shows a "PCM Coder" or Pulse Code Modulation coder. This has been mentioned above as "digital value numbers to signal the analog value of the speech wave". (PCM encoding requires at least seven times the bandwidth of the present invention and is no aid in arriving at the present invention.) The main purpose of the system is to double channel capacity by time multiplexing PCM encoded signals at a two to one basis. Again there are process steps in the Review article that are common to many other processes; such use does not preclude a process step used therein from being used in some other process. In the present invention uniform pulses are generated at the time of a detected zero crossing without the need to clip original speech. The pulses have uniform fast rise and fall times regardless of the slope of the wave for which the zero crossing is detected. The pulses signal a form of intelligent receiving means which KNOWS to hold a previous state until a new pulse is received which signals a change in state. This action, relieving the transmitter of energy use during the period between pulses. Because of such saving there results a much greater signal to noise ratio for a given transmitter power relative to that of attempting to transmit the entire "square" wave of Fawe. By storing ratios of times between zero crossings as a pattern for speech recognition, the patterns are "unitized" that is, they remain the same for a given word regardless of the absolute rate of speech of a given speaker.

Such means to encode speech is desierable and useful. For a given transmitter power, there results a greater signal to noise ratio while reducing the required bandwidth for a given information rate. In the new field of machine recognition of speech there are problems regarding different speech rates of different speakers or of the same speaker at different times. The present invention overcomes that difficulty by using ratios of times between zero crossings as patterns for recognition. The absolute-times use in other processes can vary, however the ratios-of-times enjoy a much reduced variation and aids in recognition. In static speech storage, the present method of storing information regarding the lapsed time between zero crossings reduces the amount of storage required for the same speech content, because other methods of encoding, as outlined above, gather too much information.

A principle object of this invention is to reduce the bandwidth of pulse encoded speech.

A further object of this invention is to reduce the amount of recording media used to record pulse endoded speech.

A further object of this invention is to fully utilize a selected minimum bandwidth through the use of zero crossing time information in random commutation multiplex and buffered time data compacting systems.

A further object of this invention is to use ratios of times between zero crossings as a pattern in machine recognition of speech which greatly reduces the problems caused by varying speech rates.

The foregoing and other objects of this invention are realized by a system including a means to detect zero crossings in speech, to place at the found zero crossing a generated uniform pulse. Lapsed times between such crossings are used in species to store speech and to recognize speech. An intelligent receiver reconstructs speech using the uniform pulses in a system which increases signal to noise ratio for a given transmitter power.

A better understanding can be had from the following description and accompanying drawings, wherein;

FIG. 1 is a block diagram of the basic pulse encoded communications system;

FIG. 2 is a timing diagram showing waveforms at corresponding points in the block diagram of FIG. 1;

FIG. 3 is a block diagram depicting the process steps for transmission of buffered time data compacting;

FIG. 4 is a block diagram depicting the steps to receive buffered time data compacting;

FIG. 5 is a block diagram depicting random commutation multiplex transmission;

FIG. 6 is a block diagram depicting reception of random commutation multiplex;

FIG. 7 is a block diagram depicting synchronization of random commutation multiplex;

FIG. 8 is a block diagram of a time to analog converter;

FIG. 9 is a block diagram of an analog to time converter;

FIG. 10 is a block diagram depicting storage and retrieval of pulse encoded speech;

FIG. 11 is a block diagram depicting the process for preparing time ratio patterns for machine recognition of speech; and FIG. 12 is a block diagram depicting machine recognition of speech.

BASIC SPEECH ENCODING PROCESS

To encode speech in the present invention, one must first detect the presence of a zero crossing which, in the stochastic process we call speech, can occur at any unpredictable time. When a zero crossing is discovered we wish to generate at that time a separate pulse which is unrelated in an analog manner to the original speech wave; it occurs at the time of zero crossing (regardless of sign of slope) of the original wave. There are several ways to accomplish this step, NONE OF WHICH involve clipping. One can take a voltage source and transform to a current source. (Easilly accomplished at the collector of a transistor or in the feedback path of an operational amplifier whos input is a voltage source feeding a large resistor.) Now drive the primary of a transformer that is designed to saturate at a low level of current relative to the peak of the smallest driving signal current. The secondary will produce a pulse as transformer flux changes between saturation limits. Using a center tapped secondary, allows one to select only positive going pulses (OR negative) using diodes, so that one derives unidirectional pulses regardless of the slope sign of the original wave. These pulses will vary in length as the original wave may have a high or low transition rate. To obtain uniform pulses the pulses from the transformer drive a one shot (blocking oscillator). Since a blocking oscillator is a regenerative device its pulse rise and fall rate are determined by its own set of internal parameters (Gain-beyond-unity, resistive-capacitive time constant etc.). The one shot simply starts its action when the transformer pulse forces it out of its normally cut-off state. We now have uniform pulses AT the TIME of the speech wave zero crossing and without CLIPPING the original wave. One way use an oscilloscope tube. There is no need to deflect with regard to time but only with respect to signal amplitude. Place a small aperature mask at the place where the wave goes through zero. The aperature should be small with respect to the peak amplitude of the smallest signal. Place a light detector at the mask which converts light to voltage. A pulse will now be present at the light detector as the speech signal goes through zero. Since these pulses are proportional to the signal slope as with the saturating transformer, the pulses are fed to a blocking oscillator to produce uniform pulses. It must be noted that AGAIN there is no clipping of the speech wave, yet uniform pulses mark the zero crossing event. A still further method is to use a comparator. A properly used comparator uses positive feedback to ensure a quick transition through its active window. This is necessary to avoid uncontrolled oscillation during the time the comparator is forced into its active region. (Positive feedback allows a CONTROLLED single shot oscillation.) Since the comparator is actually oscillating on a one-shot basis as it enters and leaves its active region, the transitions it produces are again uniform regardless of the transition of the speech wave that triggers it into its active region. The speech wave used to force the comparitor into its active region is NOT CLIPPED. A square wave at the output of the comparator has uniform transitions regardless of the original speech signal. Replacing a speech wave with square waves related only in time but NOT in amplitude is still NOT CLIPPING. At any rate in this process the square wave in NOT USED. The uniform transitions are immediately differentiated producing uniform exponentially decaying pulses of both polarities. (A positive pulse for the positively rising transition and a negative one for the negatively falling transition.) To obtain unidirectional pulses one can feed the original speech wave to two comparators oppositely referenced so that one has two out of phase square waves. Differentiating the two waves gives two sets of pulses, selecting pulses in one direction only using diodes one can then have uniform unidirectional pulses marking a zero crossing regardless of the sign of slope of the original wave. No further processing is necessary since these pulses are already uniform. However in actual reduction to practice a refinement was used; the exponential decaying pulses are presented to a further comparator, when the input pulse is above a positive reference the comparator one-shot-oscillates to its upper power supply rail and when the input is below the positive reference the comparator "one-shots" to its negative rail producing flat top pulses at the times of the original waves zero crossings. In actual reduction to practice a flip-flop or count down circuit was used to reconstruct square waves at the receiver replacing in time analog waves at the transmitter. Since the flip flop counts down by two or there had to be two pulses per original wave (both in the same direction) so that the final received (reconstructed) wave is of the same frequency as the original wave at the transmitter. Other methods of reconstruction are possible that do not count down. One can configure a circuit that latches up on receipt of a positive going pulse and returns down with a negative going pulse. If this kind of reconstruction is used then the positive and negative pulses out of a single comparator (as described above) can be used; there being no need for two comparators.

Alternating polarity signaling may be convenient in hard wire communications but if a radio carrier is to be used, single polarity pulseing is more convenient. Regardless of whether single polarity or opposite polarity pulses are used the process is basically one in which some uniform pulse is generated at the time of a zero crossing; the pulse(s) being sent to a reconstruction means that produces the proper count down resulting in placing square waves in time coincident with zero crossings of the original analog wave. Note these are TRUE square waves, NOT clipped analog waves. In the basic process these pulses are used to signal speech. In further species of this process, the pulses may be used to measure lapsed time between them, the lapsed times signal a time to analog converter which signal an analog to digital converter which now produces a a digital value number standing for the lapsed time between zero crossings. Such value numbers can be recorded, transmitted or further processed to lapsed-time-ratios for speech patterns. All of the above described methods used to discover random zero crossing events shall be referred to as "means to detect zero crossings". That appelation shall stand for that process step regardless of the actual mechanization used. Similarly, the means to generate uniform pulses at the time of the discovered zero crossing, shall be refered to as "means to generate uniform pulses". Again, the reconstruction means that has the inherent intelligence to remain in a state previously set until a new pulse appears (without any intervening signal energy present) shall be refered to as "intelligent reconstruction means" OR "reconstruction means".

BASIC PROCESS USED TO SIGNAL SPEECH

FIG. 1 shows the basic process to transmit speech to a remote point. Audio source (1) provides a sine wave to the means to detect zero crossings (2). (A simple sine wave is used for illustration, any complex wave may appear at its output A.) The detected zero crossing signals the uniform pulse generator (104) to generate a pulse at the time of the detected zero crossing. The pulse appears at B. The proper pulse generator is used for the type of zero crossing detector. For example, if a saturating transformer is used as the detector, a blocking oscillator is used as the uniform pulse generator. The uniform pulses are sent via hardwire or radio signal to a remote point where they are fed to the intelligent reconstruction means. At C true square waves appear in time coincidence with the original analog wave. FIG. 2 shows the timing of signals at A, B and C. It is most important to note that NO CLIPPING has occured; uniform pulses are created in time at zero crossings. (If a comparator is used to find the zero crossings, only its transitions are used for differentiation which produces uniform pulses.) If the signal frequency lowers (FIG. 2 at A) the uniform pulses spread out in time to mark the zero crossings. The first pulse at B signals the reconstruction means to change state (say to up as at C), without further signal energy the reconstruction means maintains it state (up) until the next pulse arrives to signal the reconstruction means to again change state (down in this instance). (If a pulse is lost it causes momentary distortion and a phase change of subsequent cycles but the subsequent intelligence is undisturbed.) At the receiver a TRUE square wave exists in time coincidence with the original wave. No analysis exists which can take the process out of real time. Since there is no clipping, the variable transitions of the original analog wave are gone; replaced with uniform fast transitions. It is most likely this difference that provides for the dynamics that Fawe says is lost in his clipping suggestion. Most important, SHORT pulses are sent resulting in improved signal to noise ratio without loss of information. It has been found, since the original reduction to practice, that increasing signal gain with frequency spreads out rapid changes in amplitude allowing less ambiguity in finding a zero crossing. This results in less noise added by the process (Fawe found his process added noise.) This is not pre-emphasis for intelligibility

BANDWIDTH CONSIDERATIONS

Some finite time must be assigned to the length of each pulse. The minimum bandwidth to transmit a pulse (without precise preservation of shape) is the reciprocal of twice the pulse duration. The shorter the pulse, the greater the bandwidth. Considering the maximum bandwidth of useful speech to be 4 KHz, a time period amounting to the reciprocal of 4 KHz or 250 Microseconds must be considered. Two zero-crossing pulses can define such a minimum period audio cycle. Evenly spacing the pulses would necessitate a time "window" of 125 microseconds for each pulse. Since a whole "cycle" corresponding to a pulse must be provided for, the maximum period for the pulse itself is 62.5 microseconds. Minimum bandwidth allows for no harmonics and only a fundamental sine wave can then be transmitted. Since a pulse must be sent twice in the period corresponding to the audio cycle, the maximum pulse repetition rate must be twice the maximum audio frequency. Hence, minimum bandwidth is 8 KHz. (It should be noted that such bandwidth constraint imposes "transport lag" with corresponding phase error of the highest frequencies). Typically, speech does not consist of constantly occurring 4 KHz signals so that the basic system outlined in FIG. 1 does not fully utilize the channel capacity. There are periods of time in which pulses could be sent but are not. Since bandwidth can not be conveniently varied to accommodate varying frequencies, there must be a method to fill up all the blank spaces and fully utilize the channel. This brings us to "Time compacting" and "Multiplexing".

BUFFERED TIME DATA COMPACTING MEANS

FIG. 3 shows the basic time data compacting scheme. A zero crossing detector, differentiator and rectifier is shown at 4. An audio input terminal is shown at A in FIG. 1. The output signal is shown as B in FIG. 2. A Time-to-Analog (T-A) converter shown at 5 will be explained in detail below. The output of the time to analog converter is an analog voltage which is proportional to the time between zero crossings. The analog voltage is applied to analog-to-digital (A-D) converter 6 whenever a subsequent zero-crossing pulse signals the end of time conversion. Box 6 is an analog-to-digital converter and its output is a parallel bit binary number proportional to quantized analog levels. The number of quantizing levels depends upon the resolution desired. In this example a "time window" of 125 microseconds is chosen. If useful speech is considered as existing between 400 and 4000 Hz, then there will be maximum and minimum cycle periods 2500 and 250 microseconds. The maximum time between zero crossings is half of the 2500 microsecond period or 1250 microseconds. Since the window is 125 microseconds then there should be at least ten quantizing time levels. Each time level is assigned a different digital number. The longest time is assigned the highest digital number. Four bits are required in binary to correspond to up to number ten in the decimal system. There are then four parallel output lines from the output of the A-D converter 6. Each line feeds a long shift register, 7, as shown in FIG. 3. (Only one register is shown.) The numeral 7 brackets four representative cells comprising shift register 7. Each time A-14 D converter 6 ends a conversion, it signals via line 8 in FIG. 3 a forward bit transfer of shift register 7. It also advances a "one" in auxiliary shift register 9.

Forward is to the right in the figure. The original "one" is supplied by box 10 (a wired one) at turn on of the system. Shift register 9 then has a "one" stored at the most forward position in correspondence with a data bit in shift register 7. The output of shift register 9 is used to close one switch of the switch bank 11 between the data line 12 and the most forward position of data in shift register 7. (The switches are in fact C-MOS-bidirectional gates.) This arrangement is necessary because the time between A-D outputs is random, depending on the original speech zero crossing time periods. Typically, speech does not consist of constant frequencies, and certainly not those at the extremes of 400 or 4000 Hz. In addition, there will be time lapses between uttered words and phonemes. Considering the conversion processing time of T-A and A-D is very short relative to times between zero crossings, then a new bit (or data) is presented to shift register 7 every time a new zero crossing occurs.

Harmonics do not alter the basic zero crossing rate which is governed by the fundamental. It can be shown experimentally that a high mean frequency, as in a female voice, exists at about 1000 Hz. Taking this into account and considering that there will be about a three second pause out of every ten of uttered speech, then for an effective 4000 Hz band of speech there is only an average of 1400 data bits per second delivered to shift register 7 (2 times 1000 times 7 divided by ten). The purpose of shift register 7 is to allow sampling out to data line 12 at a constant (average) rate even though delivery to register 7 occurs randomly. Clock 13 runs at four times this average sample rate or 5600 times per second. Commutator 14 sequentially contacts four data lines, only one of which is shown at 12. The other three data lines result after identical processing of the other three outputs of A-D converter 6; for clarity these are not shown. Clock 13 drives commutator 14 and divide-by-four circuit 15. After each readout of line 12, divide-by-four circuit 15 signals a backward shift of the one in shift register 9 which causes closure to register 7 via switch 11 of a single bit position further back in that register. At 9 in FIG. 3 four representative cells are bracketed comprising shift register 9. The divide by four circuit 15 also causes clearing of any "one" in the bit position of register 7 just read. It does this via a second pair of "contacts" on the gang switch 11 at that bit position.

Divide by 4 circuit 15 has three other outputs phased sequentially to drive the other three similar such processors for the other three outputs of A-D converter 6.

The length of the two shift registers must be great enough to accommodate an inordinately long (statistically speaking) string of long times between zero crossings and an inordinate number of shorter than average zero crossing times. Box 16 is a latch. It is placed at the center bit position of the two registers. When it sees its first "one" from register 9 it starts clock 13. In this way the registers are half full at the start. If there are an inordinate number of short-time zero crossings, sampling by data line 12 will move to the right, conversely an inordinate number of long-time crossings will cause movement of the sample position to the left. The longer the two shift registers, the longer will be the pause length that the system can accommodate and the narrower will be the bandwidth required of the systems at data output. To prevent operation beyond the designed-in pause-length, box 17 discovers a backward traveling "one" into the first bit position and causes shut down of the whole system by opening switch 20. Turn off of the system also causes reset of latch 17. Start up is accomplished by level detector 18 which latches on at the presence of new speech and latches off with the signal from box 17. This process compacts the data, keeping the data output line 19 "busy" at a rate equal to the AVERAGE rate of information delivery and not the maximum as would be required in a real time system.

Commutation (or parallel to serial data conversion), bit synchronization and subsequent serial to parallel conversion at the receiver are known art although a part of the process of this invention. The great savings in bandwidth obtained while utilizing pulse coding, with its enhanced signal to noise ratio should be noted. A pulse code system now in use samples a 4000 Hz signal band at 8000 times per second and uses 7 bit amplitude quantizing, resulting in 56,000 bits per second to transmit the 4000 Hz band. In this invention as described above, only 5600 bits per second are needed to transmit the same information WITH the same signal to noise enhancement. Since the average period of readout is a little more than five times the maximum input frequency period (reciprocal of 8000) the delay due to initial register storage is just under one millisecond. Even greater bandwidth savings can be had at a sacrifice of more delay by making the registers even longer to take advantage of longer pause times.

RECEPTION AND RECONSTRUCTION

FIG. 4 shows the reverse process needed to reproduce speech from the data processed above. If the data is to be sent serially as outlined above then at the receiving end the serial data must be converted to four parallel data lines. (It is possible to send the data in parallel form as obtained from the data lines in which case conversion back is not necessary.) At the receiving end, data input will occur at a constant rate but conversion to real time will be variable due to different time lengths between zero crossings as dictated by the data words received. The process then involves time buffering again, but in REVERSE, so that this part of the process can be called "inverse time buffering."

Assuming serial data reception, Box 21 FIG. 4 decommutates. That is, it provides synchronized parallel data bits, only one of which will be shown in use. This decommutator is arranged through internal delays to provide four simultaneous corresponding bits comprising a word at its output. The first bit on line 22 feeds a long shift register 23. Divide by four circuit 24 steps each bit forward along this register as it occurs. This same forward shift line also steps a "one" along register 25. The "one" is provided by box 26 at turn on. Register 25 closes a switch of switch gang 27 to the cell in register 23 containing the most forward data bit. Data line 28 and the corresponding other data lines feed this data to D-A converter 29 through sample and hold switch on switches 30. The digital words into D-A converter 29 cause an analog output corresponding to the numerical value of the digital word. A-T converter 31 then produces a time delay in proportion to the amplitude of the original analog signal. Its output is a pulse at the end of every completed analog-to-time conversion. This pulse sets flip-flop 32 high or low in consonance with its previous low or high state. The A-T converter also signals switch 30 to close (via delay 33) allowing new data to enter D-A converter 29. This same signal from the A-T also causes back shift of the "one" in register 25 and clears data in the bit position just read in register 23 via a second pair of "contacts" of switch gang 27. As in the transmitter, box 34 waits for the register 25 to have a "one" in mid-position before it allows operation of the D-A converter 29. Both registers must be long enough relative to the designed-in pause accommodation, such that the "one" in register 25 does not reach the first bit position while meaningful speech data is entering the first bit position in register 23. Box 35 senses a backward traveling "one" into the first bit position of register 25 and signals shutdown via latch 36 and switch 37. Switch 37 is turned on again by a signal from latch 36 which occurs whenever data enters the latch. It can be seen that data line 28 is in contact with the most forward bit position of register 23 and its "contact" position moves randomly back and forth in response to the zero crossing time lengths dictated by the data words. There is a delay in speech output corresponding to the length of shift registers 23 and 25 as was so in the transmitter.

RANDOM COMMUTATION MULTIPLEX MEANS

This is a method of multiplex which is unique to and takes advantage of the characteristics of the zero crossing technique of this invention. In this method several audio channels are multiplexed in random sequence. Any number of channels can be used; however in this example we will consider only three identifying them one, two and three respectively. Binary number 01 is associated with and assigned to channel one. Binary number 10 to channel two and binary number 11 to channel three. Audio for each channel is fed to a zero-crossing detector, differentiator and pulse rectifier which outputs a pulse at each zero crossing event. Such event in a channel causes that channel to "take over" and cause its channel binary number to be sent over the common carrier. At the receiving end the binary number is identified and a flip-flop associated with that channel is caused to change state. In this way three audio channels are multiplexed in random order.

The more channels involved in this scheme, the greater the bandwidth utilization, because down time (carrier off) is minimized. However, the greater the number of channels, the greater the chance of coincidence of zero crossings from two or more different channels. A comprehensive examination of probability of zero-crossing coincidence is beyond the tutorial part of this specification, however, an insight can be had from the following. The system would be confused (lose information) if two zero crossings occur at the same time. The "same time" is a time equal to the length of time of the pulse produced by the zero-crossing detector and differentiator as that is the time period during which transmission takes place. In the previous example the pulse period chosen was 62.5 micro-seconds. The worst situation is one in which two or more channels are simultaneously experiencing consonants. According to Harvey Fletcher (and others he quotes) in "Speech and Hearing in Communication" 1953, initial and final consonants average 25.8% of all sounds in telephone conversation. (This percentage assumes constant speech like that used in radio advertizing so it is a worst case situation). A typical consonant has a frequency of about 3200 Hz, corresponding to a zero-crossing rate of 6400 per second. The period between two such crossings is 156.25 microseconds. Dividing that by 62.5 microseconds shows the zero crossing period to be 2.5 times as long as the pulse period. Assuming the presence of these frequencies to be continuous, the chances of coincidence of zero crossings from a particular pair of channels is 1/2.5 or 40% and of all three channels is 1/2.5 squared or 16%. However, since consonants appear only 25.8% of the time the probability of a particular pair of channels having coincident zero crossings is 0.258 squared divided by 2.5 or 2.66%. The chances of ANY two of three channels is twice that or 5.32%.

This is a "typical" worst case (because we haven't used the extreme of three 4000 Hz consonants). Other situations would involve low frequency vowels in the other channels and reduce the chance of coincidence. A refinement in the process to be described takes into account such chance occurrences and prevents system confusion.

Referring to FIG. 5, blocks 38, 39 and 40 are each a combination of zero crossing detector, differentiator and pulse rectifier but simply labeled in the figure as "Z. C. D." Each such circuit feeds its pulse to "NAND" circuits. Circuit 41 is a two input "NAND", current 42 is a four input "NAND", Circuit 43 is a five input "NAND". All inputs of these "NANDS" must be high for a low "NAND" output which is necessary to signal blocks 44, 45 and 46.

Binary channel numbers 01, 10 and 11 are stored in these blocks. Both a clock 54 signal and a "NAND" low output are necessary for these blocks to release the stored number. Since only one "NAND" (41, 42 or 43) circuit at a time may be allowed to cause release of a channel number, there is logic preceding the three "NAND" circuits to accomplish this. Additional "NAND" circuits 47 and 48 aid in this logic. If a pulse appears at the output of 38 and 39 simultaneously, "NAND" 47 goes low and inhibits "NAND" 42 giving precedence to "NAND" 41, allowing 44 to release its digital number. Similarly "NAND" 48 watches for simultaneity in outputs of 38 and 39 which will cause inhibition of "NAND" 43 again giving precedence to 38. Note divide-by-two circuit 55 lowers the clock rate. "NAND" circuits 47 and 48 also feed their low outputs to the delay circuits 49 and 50. A low input to the delay circuits sets their outputs high and delayed by one clock pulse (times two in time). The delay is so timed that the low part of the divided-by-two clock cycle prevents imprecise release by inhibiting the "NAND" circuits 42 or 43. The next high part of that lowered clock cycle then allows release of a 42 or 43 low to its respective 45 or 46 channel number store. In this way zero-crossing events which are simultaneous do not confuse the system and at the same time are not lost. At low input frequencies, the resultant delay is trivial; at higher frequencies the delay may be technically significant but only delays a consonant slightly which does not affect the speech intelligibility. The slight distortion is a good trade-off as it allows greater information density. This refinement (simultaneous zero crossing retention) is not absolutely necessary to this basic system but does represent an improvement. The full clock rate is used to step out the two digit number in the period of the divide-by-two clock pulse (which is 125 microseconds). Delay 51 accommodates transition delay from outputs of 44, 45 or 46 to "AND" circuit 52. "OR" circuit 53 funnels the channel numbers to "AND" circuit 52. The clock output is also available for synchronizing the receiver. Synchronization is covered separately below.

RECEPTION OF RANDOM COMMUTATION MULTIPLEX

FIG. 6 shows the method of decommutating the digital words which stand for the different channel numbers. Block 56 is a serial-to-parallel converter. (Serial transmission is assumed here; it is not necessary to the process and parallel transmission can do as well.) Its inputs are synch and the serial data words of two bits corresponding to channel numbers. The upper output line is for the most significant bit and lower line the least. (This would be true for parallel transmission as well.) Study of the diagram reveals how only the presence of the proper digital word at the output of the converter 56 will allow operation of an "AND" circuit in block 57. For example, a zero and a one must be present at 56 output for channel one's "AND" (top "AND" circuit) to have all inputs up. The circuit shown in block 58 is a balanced differentiator. The leading edge of an "AND" up-output only, results in a positive pulse to flip-flop 59 which changes its state. Such state change then corresponds to a real time (neglecting transport delays) zero crossing event in THAT channel at the transmitter.

SYNCHRONIZATION

Synchronization is necessary to ensure recognition at the end processor (receiver or word synthesizer) of the proper order of bits in a data word in either the buffered time or random multiplex method. In the buffered time process four-bit words are used to identify time quanta. A word which stands for at least one level above the highest quanta level (ten in this example) can then be recognized as the synch signal. Recognition is carried out exactly as in the word recognition described above in reception of the random multiplexed words. Since time is buffered, the synch word can be inserted at regular intervals between data words corresponding to zero crossing time information. Therefore the digital word corresponding to decimal eleven (in this instance) can be used to signal synchronization. Such insertion results in maximum conservation of bandwidth as it is not necessary to send the synch on a subcarrier or extra hard line. Synchronization is a bit different for the random multiplex process. It must be remembered that though the channel words are triggered in random time they are constrained to appear only in prescribed time slots dictated by the clock. For a three channel system (two-bit words) it is not economical to signal synch by a higher digital number, for that would require always sending three digits when mostly only a two-digit word is needed. In this instance synch is accomplished by the use of a long pulse. The length is equal to two digit pulse lengths. Recognition of this synch pulse is accomplished in much the same way as is described below under TIME TO ANALOG CONVERTER. Such a long pulse is sent at the outset and synchronization at the receiver is mechanized in the same way horizontal synch is obtained in television, using the synch pulse as reference in a phase-locked loop. To ensure synch in a long conversation, this long pulse is inserted in time periods when there are no zero-crossing events (dead time) in any of the many channels. This is accomplished by a delay inserted at the output of 52 in FIG. 5. Delays are mechanized in many ways which can include a loop of tape or a short string of shift registers. FIG. 7 shows the arrangement. Delay 60 is at least three digit lengths long. The digit length referred to here is the time it takes to signal one of the two digits representing a random channel number. In our example the digit length is 62.5 microseconds, hence three such lengths equal 187.5 microseconds. T-A converter 61 (similarly mechanized to the one explained below) has an analog output that runs up whenever its input is zero and collapses whenever its input is non-zero. When a long time between zero crossings occurs (at least three digit lengths long) and is presented to T-A converter 61, it runs up high enough to trip Schmidt trigger 62. Trigger 62 then releases a long pulse (two digits long) from block 63 which is a monostable multivibrator Delay 64 times the introduction of the long pulse to "OR" 65 so that the long pulse appears one clock pulse later than the last digital word for a channel number. Last in this instance means the last digital word just preceding a discovered dead time. A long pulse for synch is now inserted in the data line whenever time is available, resulting in the most economical method of achieving synchronization. In systems where the number of channels has not used up all the digital capability, say in a four-channel system where three-bit words must be used, then a three-bit word standing for a number higher than the last channel number can be so inserted and recognized as in the buffered time example above.

TIME TO ANALOG CONVERTER

FIG. 8 shows the basic method. Z. C. D. 66 produces a pulse when it detects a zero crossing. The pulse is delayed via delay 67 which allows time for clearing old data. The Z. C. D. pulse via the uppermost line out of 66 signals switch 68 to close during the delay period of 67 to clear previous analog levels attained in integrator 69. Hold circuit 70 will only allow its output an increasing level change via signals from its input. Z. C. D. 66 also signals switch 71 during this same period to close, thus feeding an analog voltage to A-D converter 72 which completes conversion during the period. At the end of the period, switches 68 and 71 open. Delay 67 feeds unity gain sum circuit 73 whose quiescent output level is in the dead band of Schmidt trigger 74. A Schmidt trigger is used rather than a flip-flop to avoid erroneous level set. The pulse out of sum circuit 73 is great enough in amplitude to cross the upper (or lower) trigger level of the Schmidt. The Schmidt changes state and stays there even after the pulse is gone. The low output of the Schmidt (for the said state) then drops the level at the input of integrator 69 causing it to run up. The integrator runs up while the Schmidt remains low. A subsequent pulse directly out of Z. C. D. 66 is in a direction opposite to that of the delay output. This pulse is of great enough amplitude to cross the opposite Schmidt threshold and return it to a high state. The integrator at this time is discharged by closing of switch 68. Hold circuit 70 is cleared by A-D 72 at the end of conversion.

QUANTIZING

A-D converter 72 is designed to scale its analog input such that it increases its digital number by one as the input increases by one tenth of the maximum level; hence ten level quantizing wherein the longest time results in the highest digital number.

ANALOG TO TIME (A-T) CONVERTER

FIG. 9 depicts the A-T converter. Differential amplifier 75 has applied to its inverting input (upper terminal in figure) a reference voltage equal to the highest (positive) analog input. The analog input is applied to the non-inverting input. The lower the analog input voltage the greater the input difference and the greater the difference amplifier output. This output is applied to integrator 76 whose output ramps down faster for a high (positive) input. The output of integrator 76 in turn is applied to a comparator 77. A reference (REF) is applied to the comparator equal to the greatest negative excursion of the integrator. When the integrator level reaches the reference level, the comparator changes state, which event is fed to balanced differentiator 78 producing a positive pulse. This pulse is necessary to change the state of flip-flop 32 in FIG. 4. It can be seen then that a low analog input causes the greatest ramp rate resulting in the shortest time between state changes of the flip-flop. The positive output of the comparator is used to drive differentiator 78. At the positive change a signal from the comparator is used to momentarily close switch 79 which resets the integrator. When the integrator runs up, the comparator reverses, does NOT signal switch 79 and produces no output of the differentiator.

A PROCESS FOR STORING AND RETRIEVING DIGITALLY ENCODED SPEECH

There is at present a need to store speech in a machine for later commanded use. Digitally encoded speech offers the same advantages in storage as it does in transmission. Storage may be accomplished by mechanical or static means. Static storage is achieved through the use of random access memory (RAM), read only memory (ROM), programmable read only memory (PROM), and various forms of erasable programmable read only memory (EPROM). Present methods of digital speech storage make use of the sample amplitude methods alluded to earlier. These methods store entirely too much data and require excessive storage capacity. The zero-crossing technique of this invention is also useful in reducing the data necessary to store speech. In buffered time data compacting, explained above, it was shown how speech is converted to a series of digital numbers corresponding to the times between zero crossings. These same numbers are stored sequentially in a first in, first out (FIFO) type of static storage. Each set of digital numbers making up a speech word is associated with a storage address. To command a word out of storage the correct address is used to signal out the serial bits corresponding to the speech word. A shift register is then used to convert the data to parallel output. At this point the data is in the same state as at the analog to time converter 31 in FIG. 4 and the same process takes place to produce an audible word. The back shift line out of the converter is not needed in this instance. FIG. 10 shows the process. A zero-crossing detector 80 signals time-to-analog converter 81 which in turn signals analog-to-digital converter 82 as in the example above pertaining to buffered time data compacting. When A-D converter 82 completes conversion, it signals an address-generator-counter 84. Each conversion signal causes an increase in its count. This count is stored in a storage device 83. The count number is stored in storage device 83 as an address in association with the digital word also released from A-D converter 82 to storage device 83. A pause detector 85 is pre-programmed to differentiate between the times between zero crossings and the much longer pause between speech words. Pause detector 85 inhibits the counter from increasing its count during the process of recording all the zero-crossing events in a single speech word. A line directly out of the zero crossing detector 80 steps the storage device to receive new digital words for new zero-crossing times. To retrieve a speech word, command unit 86 sends the proper address to storage device 83 which then releases a sequence of digital numbers corresponding to zero crossing times to D-A converter 87 which in turn releases the analog value to A-T converter 88. A-T converter 88 signals back to storage device 83 an inhibit signal which prevents new releases from 83 during the time analog-to-time conversion is taking place. On completion of a conversion in A-T converter 88 the inhibit signal is removed and a new zero-crossing number is released. A-T converter 88 signals a state change in flip-flop 89 at the end of each time conversion.

THE ZERO CROSSING TECHNIQUE AND MACHINE RECOGNITION OF SPEECH

Presently, there is a need for machine recognition of speech. Devices exist wherein command words spoken to the machine are recognized and some function is carried out such as typing the word. The technique uses "templates" on which are recorded certain characteristics of selected words and sentences. The spoken words are analyzed in the same manner that the original words were analyzed to make up the template and a comparison between presented word(s) and template(s) is made. A successful comparison then results in recognition. (For a full discussion of this technique, see the literature; 1978 Wescon session 28). Zero-crossing technique can again reduce the complexity and expense of such equipment and the following represents one further species of the basic zero-crossing process of this invention. In this species, patterns are prepared by analyzing a word for its series of zero-crossing times. A great improvement is at hand if, instead of merely recording a series of absolute times, one records a series of ratios for the pattern. The first time (as a number) between zero crossings is recorded and used as a base. Each further zero-crossing time is then divided by the base time either in an analog or digital form. Carrying this process out for each zero crossing time, a series of time ratios is obtained. Hence, we establish "time ratio patterns" which will be used as reference patterns in a machine "vocabulary." The same word uttered by different speakers (or the same speaker at different times) will certainly occur at different rates. However, the RATIO of times of zero crossings will not differ appreciably even though the word is delivered at different rates. The spoken command word is analyzed in this same way, recorded and then compared for the same sequence of ratios with every pattern in the machine's "vocabulary." A comparison of this type is "state of the art" and is available now even in a programmable hand-held calculator. The process includes equipment which makes comparisons between reference patterns in the machine "vocabulary" and patterns newly generated for a spoken command word. A successful comparison results in a word (or sentence) recognized. The recognition can then signal any result, such as reproduction of the word, typing it, or carrying out a command.

FIG. 11 shows the process. Zero-crossing detector is shown at 90 combined with a time-to-analog converter and an analog-to-digital converter previously explained. Switch 91 is the solid state equivalent of a double-pole, double-throw device. It is initially set so that the upper arm is down, closed to its contact. The first digital word representing a zero-crossing time is then presented by 90 to store circuit 92, which in addition to storing the digital number throws switch 91 so that the upper contact opens and the lower contact closes to steer the next digital number to storage circuit 93. Storage circuit 93 then throws its associated switch 94 to steer the next digital number to storage circuit 95 and so on. Only the first few such circuits are shown. There must be a sufficient number of these circuits to accommodate the longest speech word to be identified. The digital word stored in 92 is the base number and is presented to a digital divider circuit 97 as the constant denominator. Each time a store circuit other than the first (base store) flips its own double-pole switch it also signals step circuit 96 which signals divide circuit 97 to calculate and transfer the data to pattern storage 98. Step circuit 96 also advances the store position in 98 so that new data may enter. Step circuit 96 also contains a long pause recognition circuit. The pause recognition determines "end of spoken word" and resets switches 91, 94, etc. To identify a word stored as a reference pattern in 98, a pattern must be generated for the word newly spoken which may be a command to a machine to perform an operation such as to type a word or dispense a drink. The dashed-line box in FIG. 11 encompasses the pattern generating capability and is totally represented by dashed box 99.

The contents of box 99 are repeated in a second piece of equipment for the purposes of recognition and that equipment is represented in FIG. 12. A command word is presented to box 99 in FIG. 12 for analysis and forming a temporary time ratio pattern. When a new pattern is completed by 99 it is presented to temporary storage 100. Box 101 is a digital word comparator. It compares a sequence of digital words bit by bit for equality. When it finds an equality in an entire sequence it produces an output pulse. Box 102 is a stepper, it presents a stored reference pattern for comparison upon external command. (External command refers to a requirement for the circuit to activate, it should not be confused with a "command word" which is presented for analysis at box 99.) Failure of recognition by 101 causes a signal to be sent to 102 to step to the next reference pattern and continues to do so until a pattern is recognized. Each time a pattern in 98 is stepped for comparison, the arm of commutator 103 is moved to a new position. Upon successful comparison 101 activates the commutator by supplying a pulse and functions mentioned above can be carried out by proper devices connected to the commutator.

It is to be understood in the claims to follow that the novelty presented thus far in the specification is the use of zero-crossing time alone to store, transmit and recognize speech. Such utilization greatly reduces the bandwidth required in digital transmission and storage room required in digital speech storage. Word (or sentence) recognition is also much simplified using this technique. Methods of signal transmission have been presented to show how to take advantage of the great bandwidth savings possible with the zero-crossing technique. It should be understood that the zero-crossing technique can be used by itself or in any combination so far described. Minor variations of the features in this disclosure which still come within the intent and equivalency of the appended claims, are intended to be embraced therein.

What I claim is:

1. A process for encoding speech comprising the steps of;
   (a) discovering the random zero crossing events of speech in real time by using a non-clipping means to detect zero crossings;
   (b) using an output signal of said means to detect zero crossings to drive a means to generate uniform pulses which are narrow, of constant width and constant amplitude, said pulses being time coincident with said zero crossings;
   (c) transmitting said pulses to a remote point;
   (d) receiving said pulses; and
   (e) applying said pulses to an intelligent reconstruction means which is configured to latch up on receipt of a positive pulse and latch down on receipt of a negative pulse.

2. A process for digitizing speech in preparation for transmission comprising the steps of;
   (a) detecting the zero crossings of speech using a non-clipping means to detect zero crossings in real time;
   (b) using an output of said zero crossing means to drive a pulse generator the output of which are narrow constant width constant amplitude pulses;
   (c) applying said pulses to a time-to-analog converter to obtain an analog signal representing the time between said pulses;
   (d) applying said analog signals to an analog-to-digital converter to derive a series of parallel bit digital words representing the time intervals between zero crossings; e) presenting said parallel bit digital words to a number of shift registers, each of said shift registers corresponding, respectively, to one bit position in the parallel word,
   f) keeping track of which cell of said shift registers has a bit stored in the most advanced position thereof by providing an auxiliary shift register, containing an inital one in which said "one" is advanced each time said analog-to digital converter completes a conversion, and provides a signal to said auxiliary shift register;
   g) advancing bits in said shift registers each time a conversion is completed by said analog-to-digital converter;
   h) connecting data lines from each of said parallel bit positions in said shift registers to commutators switched by said signals from auxiliary shift register;
   i) stepping the armatures of said commutators by means of a clock sequentially to sample bits from said data lines corresponding to each parallel bit position, said clock also driving a divide-by-four circuit;
   j) said divide-by-four circuit causing a backward shift of a one in said auxiliary shift register, closing the commutator switch position, and opening all other commutator switch positions and clearing any one in any shift register cell forward of said switch closure;
   k) providing a synchronizing signal from said clock to ensure reassembly of the now sequential bits in proper parallel order; and
   l) transmitting said now sequential bits at a constant average rate along with said synchronizing signal to a remote point.

3. A process as in claim 2 including the step of storing said sequential bits in an appropriate storage medium.

4. A process for reconstruction of speech from the digitized speech signals resulting from the process of claim 2 comprising the steps of;

a) receiving said sequential bits and converting them to parallel bits;
b) inverse time buffering said bits; and
c) applying pulses resulting from said inverse time buffering to a means for reconstructing speech for the purpose of producing square waves corresponding in periods to the periods of the orginal speech waves detected in said process.

5. A process as in claim 3 comprising the additional steps of retrieving said bits from storage and presenting said bits to a means for constructing speech.

6. A process for digitizing speech in preparation for storing in memory comprising the steps of;
a) detecting the zero crossings of speech waves to derive transition signals therefrom;
b) using means for deriving data from said transition signals representative of said zero crossings to obtain, in real-time, time-interval pulses indicating the time intervals between successive zero-crossing events, said pulses being narrow, of constant amplitude and constant width;
c) presenting said pulses to a time-to-analog converter;
d) presenting the analog output of said converter to an analog-to-digital converter to produce digital words representing the time between zero crossings;
e) providing a synchronization signal for the purpose of later separating said words, and
f) storing said words in an appropriate memory.

7. A process as in claim 6 including the additional steps of;
a) retrieving said digital words from said memory;
b) presenting said digital words, appropriately separated with the aid of said synchronization signal, to a digital-to analog converter;
c) the output of said digital-to-analog converter driving an analog-to-time converter, and
d) output pulses of said analog-to-time converter signalling a speech construction means.

8. A process for digitizing speech from several simultanious audio channels in preparation for transmission, comprising the steps of;
(a) detecting the zero crossing events in all of several audio channels simultaniously;
(b) assigning a digital number to each of said channels;
(c) transmitting to a remote point the digital number of a channel at the time said channel experiences a zero crossing event;
(d) presenting said digital number to a decoding logic circuit comprising inverters and AND circuits, said AND circuits including outputs for each of said channels for which a digital number has been assigned;
(e) said inverters and AND circuits being so connected that only one AND output will go up for a particular digital number presented, and only for that number corresponding to the channel said AND circuit is assigned to;
(f) presenting said AND outputs to ballanced differentiators, the output of said differentiators being unidirectional, narrow constant width pulses; and
(g) said unidirectional pulses being presented to a means for constructing speech which produces square waves, the periods of which correspond to the periods of said speech waves.

9. A process to encode speech suitably to form patterns for machine recognition of speech comprising the steps of;
a) discovering the random zero crossing event of speech in real time by using a non-clipping means to detect zero crossings;
b) using an output signal of the means to detect zero crossings to drive a means to generate uniform narrow, constant width pulses, said pulses being time coincident with said zero crossings;
c) presenting said pulses to a time-to-analog converter;
d) using a first conversion period as a base period to be divided into successive converted times resulting in divide-by-base time analog values;
e) converting the analog values to digital numbers;
f) collecting a set of such numbers representing time ratios as time ratio patterns;
g) preparing several such patterns to be stored in memory for a machine vocabulary.

10. A process for machine recognition of speech comprising the steps of;
a) detecting the zero crossing events in speech waves;
b) gathering data defining the real-time between zero crossings by using a means for providing information on the time between zero crossings, said means producing narrow constant width pulses marking the real-time of said zero crossing events;
c) presenting said pulses to a time-to-analog converter;
d) preparing temporary time ratio patterns in a manner of the process used in claim 31 to create time ratio patterns;
e) using said temporary patterns for comparison in a comparison means bit-by-bit with previously prepared time ratio patterns stored in appropriate memory as machine vocabulary; and
f) upon a successful comparison having said comparison means provide a command to a device to carry out any of the functions assigned to a recognized word.

11. A process for pulse encoding speech comprising the steps of;
a) discovering the random zero crossing events of speech in real time by using a non-clipping means to detect zero crossings;
b) using an output signal of said means to detect zero crossings to generate constant amplitude pulses the leading edge(s) of which are coincident with said zero crossing, the time length of said pulses may vary for the purpose of transmitting additional information and said pulses have a maximum allowable length; said lengths having no bearing or relationship to the times between zero crossings; and
c) transmitting said pulses to a remote point.

12. A process for reconstructing speech comprising the steps of;
a) receiving said pulses so generated in claim 11; and
b) applying said pulses to an intelligent reconstruction means.

* * * * *

UNITED STATES PATENT AND TRADEMARK OFFICE
CERTIFICATE OF CORRECTION

PATENT NO. : 5,157,727

DATED : October 20, 1992

INVENTOR(S) : Alden Schloss

It is certified that error appears in the above-identified patent and that said Letters Patent is hereby corrected as shown below:

In the claims:

Renumber claim 1 as claim 3.

Renumber claim 2 as claim 4.

Renumber claim 3 as claim 5, and on line 1 delete "2" and insert —4—.

Renumber claim 4 as claim 6, and on line 3 delete "2" and insert in its place —4—.

Renumber claim 5 as claim 7, and on line 1 delete "3" and insert —5—.

Renumber claim 6 as claim 8.

Renumber claim 7 as claim 9, and on line 1 delete "6" and insert — 8 —.

Renumber claim 8 as claim 10.

Renumber claim 9 as claim 11.

Renumber claim 10 and claim 12.

Renumber claim 11 as claim 1.

Renumber claim 12 as claim 2, and on line 3 delete "11" and insert — 1 —.

UNITED STATES PATENT AND TRADEMARK OFFICE
CERTIFICATE OF CORRECTION

PATENT NO. : 5,157,727
DATED : October 20, 1992
INVENTOR(S) : Alden Schloss

It is certified that error appears in the above-indentified patent and that said Letters Patent is hereby corrected as shown below:

In Figure 1, insert element 104 between elements 2 and 3 such that it looks like the following:

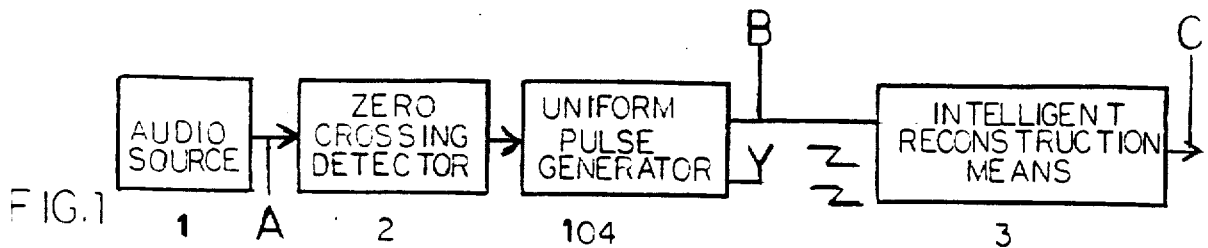

Signed and Sealed this

Fifteenth Day of June, 1993

Attest:

MICHAEL K. KIRK

Attesting Officer

Acting Commissioner of Patents and Trademarks